United States Patent
Carey et al.

(10) Patent No.: US 6,728,952 B1
(45) Date of Patent: Apr. 27, 2004

(54) IDENTIFICATION OF VACUOUS PREDICATES IN COMPUTER PROGRAMS

(75) Inventors: Michael James Carey, San Jose, CA (US); Serge Philippe Rielau, Ajax (CA); Bennet Vance, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/405,884

(22) Filed: Sep. 24, 1999

(30) Foreign Application Priority Data

Sep. 24, 1998 (CA) ............................................... 2248393

(51) Int. Cl.⁷ ................................................. G06F 9/45
(52) U.S. Cl. ...................... 717/141; 717/136; 717/142; 717/143; 717/144; 717/146
(58) Field of Search ................................ 717/124, 132, 717/133, 136, 141, 142, 143, 144, 146

(56) References Cited

U.S. PATENT DOCUMENTS 5,713,015 A * 1/1998 Goel et al. ..................... 707/4

OTHER PUBLICATIONS

Lee et al., "Detection of Exclusive or Global Predicates", IEEE International Conference, pp.: 213–216, Oct. 1998.*
Carson et al., "The Geometry of Semaphore Programs", ACM Transactions on Programming Languages and Systems, pp. 25–53, Jan. 1987.*
Hanson et al., "A Predicate Matching Algorithm for Database Rule Systems", ACM, pp. 271–280, 1990.*
Jutla et al., "A Predicate Transformer Approach to Semantics of Parallel Programs", ACM, 249–263, 1989.*

* cited by examiner

Primary Examiner—Tuan Q. Dam
Assistant Examiner—Ted T. Vo
(74) Attorney, Agent, or Firm—Ronald L. Drumheller; Marc D. McSwain

(57) ABSTRACT

A computer system identifies a predicate in a computer language containing constant expressions as vacuous. The system identifies distinct variables contained in the predicate and represents the predicate by a set of bounding rectangles. The bounding rectangles are represented in a space having a number of dimensions equal to the number of variables. There are finite limits on dimensions of a bounding rectangle which represent the relationship between the variables in the predicate and the constant expressions in the predicate. The predicate is identified as vacuously FALSE where the set of bounding rectangles is empty.

28 Claims, 15 Drawing Sheets

10=x+y OR z IS NULL OR (x+y<=5 AND x+y>=-8)

Subroutine: Transform_into_geom_shapes

Input: Class          Predicate definition using SQL predicates
       variable_array List of the variables (e.g. X_1 = A+B, X_2 = C . . .)

Output: Class_shapes   List of "rectangles" representing the predicate

| |
|---|
| CALL: Replace_expressions_w_variables(Class, variable_array) -> Class (Replaces complex expressions by variables in array, e.g. A+B -> X_1) |
| CALL: Solve_IN_etc(Classs) -> Class (Replaces special SQL predicates like IN and BETWEEN) |
| CALL: Pushdown_NOTs(Class) -> Class (Eliminates NOT predicates by pushing them down with DeMorgan Laws) |
| CALL: Build_geom_shapes_recursive(Class, variable_array) ->Class_shapes (Gathers the geometric shapes representing the transformed Class |
| RETURN: Class_shapes |

FIG. 9

Subroutine: Replace_expressions_w_variables

Input: Class           Predicate definition using SQL predicates
       Variable_array  List of the variables (e.g. X_1 = A+B, X_2 = c ...)

Output: Class          Predicate definition with expressions replaces by variables

| for each expression (exp) in Class | | | |
|---|---|---|---|
| i = <- 0 | | | |
| while (i < #variables) AND NOT(variable_i in variable_array represents exp) | | | |
| | i <- i + 1 | | |
| | (i < #variables) ? | | |
| | yes | no | Replace exp in Class by UNKNOWN variable |
| | Replace exp in Class by variable_i | | |
| RETURN: Class with expressions replaces by variables | | | |

FIG. 10

```
Subroutine: Solve_IN_etc
Input:  Class      Predicate definition using SQL predicates
Output: Class      Predicate definition with IN and BETWEEN
                   replaces
Comment: This method replaces all occurrences of IN and BETWEEN by
         semantically equivalent predicates.

I.e. exp1 IN (exp2, exp3, ...)  gets replaced by
              (exp1 = exp2) OR (exp1 = exp3) OR ...\
              and exp1 BETWEEN exp2 AND exp3 get replaced by
              (exp1 >= exp2) AND (ex1 <= exp3)
         This routine is part of the effort to reduce the Class to
         contain only AND, OR, =, <, >, <=, >=  and IS (NOT) NULL
```

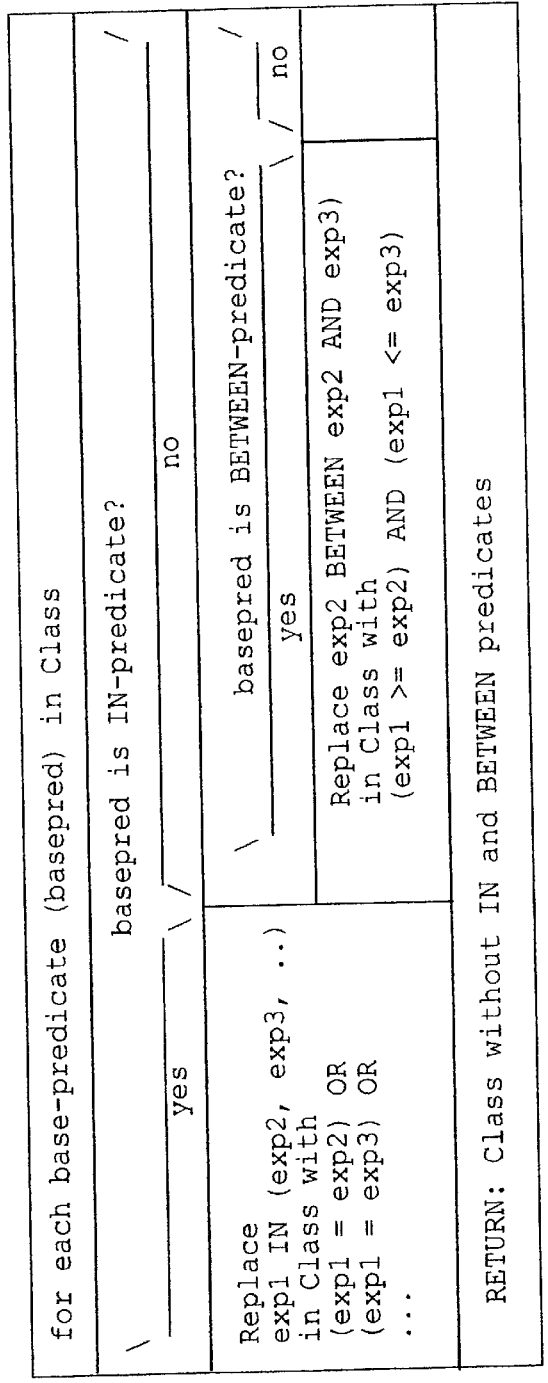

FIG. 11

```
Subroutine: Pushdown_NOTs
Input: Class       Predicate definition using SQL predicates
Output: Class      Predicate definition with NOT and '< >' replaced Comment: This method replaces all occurrences of NOT, or '< >' by
         semantically equivalent predicates.

I.e.  NOT(pred1 AND pred2)    -> NOT(pred1) OR NOT(pred2)
          NOT(pred1 OR pred2)     -> NOT(pred1) AND NOT(pred2)
          NOT(NOT(pred1))         -> pred1
          NOT(expl < > exp2)      -> (expl = exp2)
          NOT(expl >= exp2)       -> (expl < exp2), and similar ...
          (expl < > exp2)         -> (expl < exp2) OR (expl > exp2)
          NOT(expl IS NOT NULL)   -> (expl IS NULL
          NOT(expl IS NULL)       -> (expl IS NOT NULL
``` for each node is Class (topdown treewalk!)

node is NOT-predicate?

yes /             \ no

Replace NOT in Class          node is '< >' base-predicate?
depending on rules
applicable in comment    yes /       \ no
above.
               Replace (expl < > exp2) in Class
               with
               (expl < exp2) OR (expl > exp2)

RETURN: Class free of NOT predicates and '< >' base predicates

FIG. 12

Subroutine: Build_basepred_geom_shape
Input: basepred    Base-predicate (or UNKNOWN predicate)
       variable_array    List of the variables (e.g. X_1 = A + B, X_2 = C ....)
Output: Shapes    List of one rectangle describing the base predicate
                  in the variable space or rectangle describing the
                  variable space if predicate, expressions or constant
                  unknown.

| | | | | |
|---|---|---|---|---|
| Shape <- Whole variable space of variable array (X_1: -oo, +oo or NULL, ...) | | | | |
| basepred is '=', '<', '>', '<=', '=>', 'IS NULL' or IS NOT NULL? | | | | |
| yes | \ / no | | | |
| i <- empty const <- empty | | | | |
| left expression is variable in variable_array? | | | | |
| yes | \ / no | right expression is variable in variable_array ? | | |
| | | yes | \ / no | |
| i <- number of that var in variable_array | | i <- number of that var in variable_array | | |
| | | | left expression is constant? | |
| | | | yes | \ / no |

FIG. 14A

COMMENT: Now const and i are initiated to a value if there is
exactly one expression with a variable in the variable_array
and one expression with a constant (if not IS (NOT) NULL pred).
It is possible to handle other cases as well (eg '1 = 2')
but we ignore this here for the sake of readability.

```
         i is not empty and
  (const is not empty or basepred is IS (NOT) NULL
```

\ /
     X  no
    / \
   yes

CALL: narrow_shape(Shape, basepred, i, const) -> Shape shapes: <- { Shape }

RETURN: shapes

FIG. 14B

```
Subroutine: Unify
Input:  left_shapes    Two sets of shapes
        right_shapes
Output: shapes         optimized unification of the two sets of shapes
```

Shapes <- left_shapes + right_shapes for all shapes shape_i in Shapes do for all shapes shape_j in Shapes with j > i
    and shape_i still in Shapes do shape_j contained in shape_i?
        yes / \ no Shapes <- Shapes - shape_j shape_i contained in shape_j?
        yes / \ no Shapes <- Shapes - shape_i Neither shape_i nor shape_j eliminated yet?
        yes / \ no shape_i equals shape_j in all but one dimension
        AND shape_i overlaps shape_j?
        yes / \ no new_shape <- shape_i merged with shape_j
        Shape <- Shapes - shape_i - shape_j + new_shape RETURN: Shapes

*FIG. 15*

IDENTIFICATION OF VACUOUS PREDICATES IN COMPUTER PROGRAMS

FIELD OF THE INVENTION

The present invention is directed to an improvement in computing systems and in particular to the identification of vacuous predicates in computer programs.

BACKGROUND OF THE INVENTION

In computer systems it is often advantageous to recognize predicates which are always true or always false (vacuous predicates). Predicates that are always TRUE are known as "tautologies", and the problem of identifying such predicates, which is known as "tautology checking", is a familiar problem in computer science. The problem of identifying predicates that are always FALSE is essentially the same problem, since such predicates become tautologies when negated. Examples of where identification of vacuous predicates is of value include computer program optimization and error-checking. An example of where the identification of vacuous predicates assists in optimization involves the compilation of an IF statement. If the expression on which the IF statement depends is identified as a vacuous predicate, the code for the IF statement may be optimized as the expression on which the IF statement depends will always be either TRUE or always FALSE.

Specialized computer systems exist which are able to determine whether a predicate is vacuous. For example, special programming languages such as Prolog are designed to permit theorem proving tools to be constructed which will identify vacuous predicates. Prior art approaches include the use of common techniques such as simplifying predicate manipulations by converting the predicates to conjunctive normal form (CNF) or to disjunctive normal form (DNF). Such prior art approaches to the problem, however, are potentially complex and slow and therefore have restricted applicability. For example, the problem of determining whether two predicates p and q are mutually exclusive (restated, whether the predicate p AND q is vacuously FALSE), can be solved using prior art techniques. However, the problem of identifying vacuous predicates is NP-hard and as a result, test cases can be constructed which will result in such powerful theorem-proving techniques running for an unacceptably long time, or requiring an unacceptable amount of computer memory.

A construct which is not atypical in the computer programming language SQL, such as NOT (product_code IN (2, 3, 5, 7, 11, 13, . . . 149, 151))
can give rise to a predicate in the form
 (p1 OR q1) AND (p2 OR q2) AND (p3 OR q3) AND . . . AND (p40 OR q40).

Such a predicate will give rise to an unacceptably large memory requirement, if converted to DNF. It is therefore desirable to have a system and method which will identify vacuous predicates in computer programs, in many practical cases, using less time and memory resources than the prior-art theorem-proving approaches. A system using such an approach will be advantageous in a practical sense even where it is not able to correctly identify all vacuous predicates, if it can quickly and simply identify many vacuous predicates.

SUMMARY OF THE INVENTION

According to one aspect of the present invention, there is provided an improved system and method for the identification of vacuous predicates in computer programs.

According to another aspect of the present invention, there is provided a computer system for identifying a predicate in a computer language as vacuous, the predicate containing one or more constant expressions, comprising means for identifying distinct variables contained in the predicate and for defining a predicate dimension number equal to the number of variables identified in the predicate, means for representing the predicate by a set of bounding rectangles, wherein a bounding rectangle is represented in a space having a number of dimensions equal to the predicate dimension number, wherein a finite limit on a dimension of a bounding rectangle represents the relationship between a one of the identified variables contained in the predicate and a one of the constant expressions in the predicate, and means for signalling that the predicate is vacuously FALSE where the set of bounding rectangles is empty.

According to another aspect of the present invention, there is provided, for the above computer system, a means for representing the predicate by a set of bounding rectangles which comprises means for deriving the set of bounding rectangles whereby a first selected one of the bounding rectangles is discarded from the set of bounding rectangles when the first selected one of the input rectangles is empty, discarded from the set of bounding rectangles when the selected one of the bounding rectangles is contained within any other rectangle in the set of bounding rectangles, merged with a second selected one of the bounding rectangles when the two rectangles exactly agree in all dimensions but one.

According to another aspect of the present invention, there is provided for the computer system above, a means for representing the predicate by a set of bounding rectangles which comprises a means for deriving the set of bounding rectangles by replacing a selected pair of rectangle sets in the set of bounding rectangles with a replacement rectangle set where the selected pair of rectangle sets correspond to expressions in the predicate subject to the operator AND, and where the replacement rectangle sets represent the intersection of the selected pair of rectangle sets.

According to another aspect of the present invention, there is provided for the computer system of above, a the means for representing the predicate by a set of bounding rectangles which comprises transforming means for transforming the predicate into an intermediate expression logically equivalent to the predicate, the intermediate expression containing only subexpressions which may be directly represented as rectangles, and means for representing the intermediate expression as a set of bounding rectangles.

According to another aspect of the present invention, there is provided the above computer system in which the intermediate expression consists of SQL expressions containing AND, OR, =, <, >, <=, >=, IS_NULL and IS_NOT_NULL.

According to another aspect of the present invention, there is provided the above computer system in which the transforming means comprises means for replacing expressions containing NOT and expressions containing <> with logically equivalent expressions containing only one or more of AND, OR, =, <, >, <=, and >=.

According to another aspect of the present invention, there is provided the above computer system in which the means for identifying variables uses syntactic matching to recognize distinct variables.

According to another aspect of the present invention, there is provided the above computer system in which the means for identifying variables uses semantic rules to recognize distinct variables.

According to another aspect of the present invention, there is provided a method for identifying a predicate in a computer language as vacuous, the predicate containing one or more constant expressions, comprising the steps of identifying distinct variables contained in the predicate, defining a predicate dimension number equal to the number of variables identified in the predicate, representing the predicate by a set of bounding rectangles, wherein a bounding rectangle is represented in a space having a number of dimensions equal to the predicate dimension number, wherein a finite limit on a dimension of a bounding rectangle represents the relationship between a one of the identified variables contained in the predicate and a one of the constant expressions in the predicate, and signalling that the predicate is vacuously FALSE where the set of bounding rectangles is empty.

According to another aspect of the present invention, there is provided a computer system for identifying a predicate in a computer language as vacuous, the predicate containing one or more constant expressions, comprising means for identifying distinct variables contained in the predicate and for defining a predicate dimension number equal to the number of variables identified in the predicate, means for reducing the predicate to a logically equivalent intermediate predicate which includes no operators other than those in the set of AND, OR, =, <, <=, >, >=, IS NULL and IS NOT NULL, means for representing the set of base predicates in the intermediate predicate by a set of rectangles wherein the set of rectangles are represented in a space having a number of dimensions equal to the predicate dimension number and each rectangle has limits on each of its dimensions, the limits being finite or infinite, a finite limit on a dimension of a rectangle representing the relationship between a one of the identified variables and a one of the constant expressions in the set of base predicates, an infinite limit on a dimension of a rectangle representing the absence of a relationship between a one of the identified variables and any of the constant expressions in the set of base predicates, means for manipulating the set of rectangles whereby an AND operator in the intermediate predicate is implemented by performing an intersection on the subsets of rectangles corresponding to the portions of the intermediate predicate to which the AND operator is applied, the OR operator is implemented by performing a union on the subsets of rectangles corresponding to the portions of the intermediate predicate to which the OR operator is applied, and whereby a first selected one of the set of rectangles is discarded from the set of rectangles when the first selected one of the rectangles is empty, discarded from the set of rectangles when the selected one of the rectangles is contained within any other rectangle in the set of rectangles, merged with a second selected one of the rectangles when the two rectangles exactly agree in all dimensions but one, and means for signalling that the predicate is vacuously FALSE where the set of rectangles is empty after manipulation by the means for manipulating the set of rectangles.

According to another aspect of the present invention, there is provided the above computer system in which the predicate represents two or more object view definitions in SQL and the identification of the predicate as vacuously FALSE represents an error check to determine that the two or more object view definitions are mutually exclusive.

According to another aspect of the present invention, there is provided a method for error checking the mutual exclusivity of SQL object view definitions, comprising the steps of constructing a predicate representing two or more object view definitions in SQL, identifying distinct variables contained in the predicate and defining a predicate dimension number equal to the number of variables identified in the predicate, reducing the predicate to a logically equivalent intermediate predicate which includes no operators other than those in the set of AND, OR, =, <, <=, >, >=, IS NULL and IS NOT NULL, representing the set of base predicates in the intermediate predicate by a set of rectangles wherein the set of rectangles are represented in a space having a number of dimensions equal to the predicate dimension number and each rectangle has limits on each of its dimensions, the limits being finite or infinite, a finite limit on a dimension of a rectangle representing the relationship between a one of the identified variables and a one of the constant expressions in the set of base predicates, an infinite limit on a dimension of a rectangle representing the absence of a relationship between a one of the identified variables and any of the constant expressions in the set of base predicates, manipulating the set of rectangles whereby an AND operator in the intermediate predicate is implemented by performing an intersection on the subsets of rectangles corresponding to the portions of the intermediate predicate to which the AND operator is applied, the OR operator is implemented by performing a union on the subsets of rectangles corresponding to the portions of the intermediate predicate to which the OR operator is applied, and whereby a first selected one of the set of rectangles is discarded from the set of rectangles when the first selected one of the rectangles is empty, discarded from the set of rectangles when the selected one of the rectangles is contained within any other rectangle in the set of rectangles, merged with a second selected one of the rectangles when the two rectangles exactly agree in all dimensions but one, and signalling that the object views definitions are mutually exclusive where the set of rectangles is empty after manipulation by the means for manipulating the set of rectangles.

Media encoded with program code to effect the above-described system or method is also provided in the invention.

Advantages of the present invention include a method which is able, in many practical cases, to efficiently identify vacuous predicates.

BRIEF DESCRIPTION OF THE DRAWINGS

The preferred embodiment of the invention is shown in the drawings, wherein:

FIGS. 7 to 16 are flowcharts representing routines used to implement the preferred embodiment.

DETAILED DESCRIPTION OF THE PREFERRED EMBODIMENTS

Figure 1:
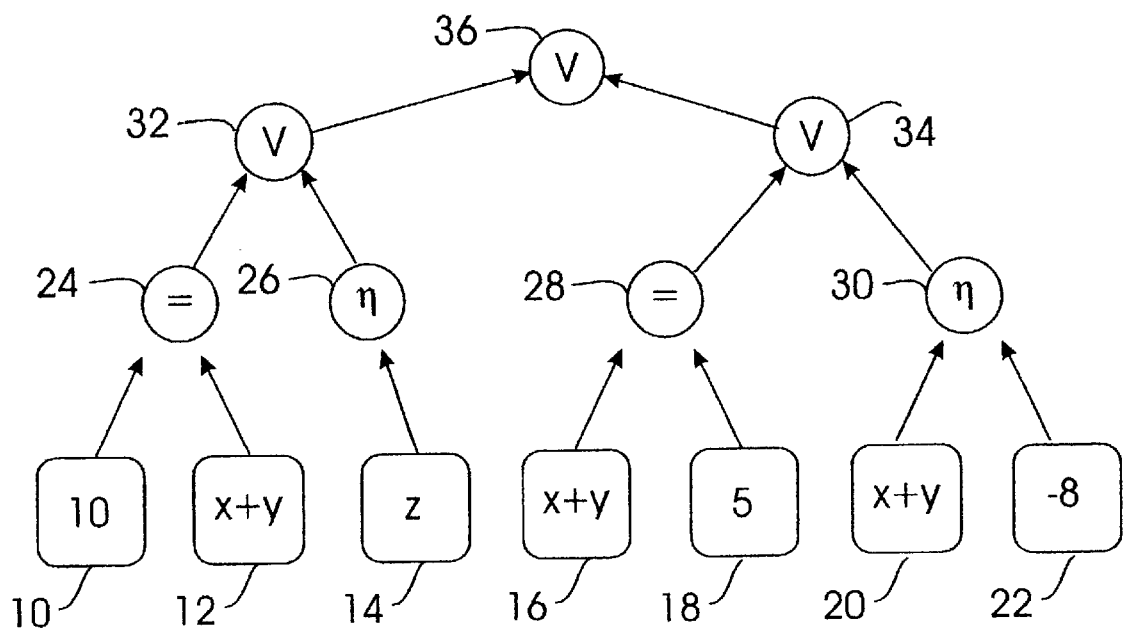
FIG. 1 is a tree-diagram illustrating an example predicate of the type processed by the system of the preferred embodiment of the invention.

In the drawings, the preferred embodiment of the invention is illustrated by way of example. It is to be expressly understood that the description and drawings are only for the purpose of illustration and as an aid to understanding, and are not intended as a definition of the limits of the invention.

Referring to FIG. 1, there is illustrated in a tree-diagram format a predicate tree corresponding to the predicate 10=$x+y$ OR $z$ IS NULL OR ($x+y$<=5 AND $x+y$>=−8).

Leaf nodes 10 to 22 are the lowermost nodes in the tree and represent constants (in the example of FIG. 1, integers in nodes 10, 18, 22) and expressions (the remaining leaves at the lowermost level of the tree, nodes 12, 14, 16, 20). The next to bottom level of the tree contains nodes 24 to 30, which correspond to base-predicates. The upper two levels contain nodes 32 to 36 which correspond to compound predicates.

The method or system of the invention is applicable to predicates involving numeric comparisons. It is also applicable to predicates involving any other scalar type for which there is total order. For example the preferred embodiment of the invention will be applicable to predicates involving strings of characters, or to SQL DISTINCT types.

In the preferred embodiment described below, the system or method of the invention will be described with reference to the identification of a vacuous predicate relating to the mutual exclusivity of a pair of given predicates (the predicate p AND q is always FALSE if and only if the two predicates p and q are mutually exclusive).

It will be understood to one skilled in the art that an application of the preferred embodiment which results in an empty set of rectangles (as described in more detail below) signifies that the predicate which was started with is vacuously FALSE. To establish that a predicate p is vacuously TRUE using the preferred embodiment of the invention, it is possible to use the preferred embodiment with respect to NOT p. If the resulting set of rectangles is empty then p is vacuously TRUE.

The preferred embodiment of the invention as described below relates to mutual exclusivity of predicates and makes use of the observation that one can often identify vacuous predicates by means of geometric representations. The preferred embodiment of the invention takes two predicates and by representing the predicates as rectangles, determines whether the rectangles intersect. The manner of representing predicates as rectangles to permit the operation of the preferred embodiment, is set out below. The description below outlines how to identify variables in the predicates, how simple equalities and inequalities in predicates are represented using sets of rectangles, how defined sets of rectangles are manipulated to provide system efficiencies, how complex predicates (involving Boolean operators) are represented as sets of rectangles, and how mutual exclusivity of predicates is identified using the manipulated rectangular representations of the predicates.

Figure 2:
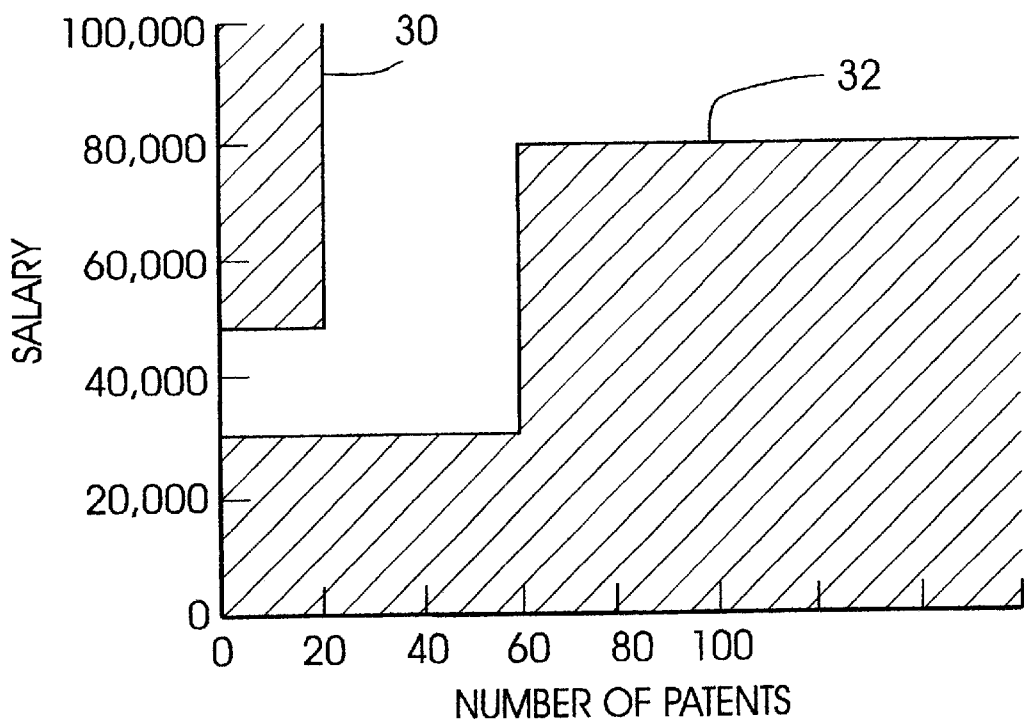
FIG. 2 is a graphical representation of a further example of predicates of the type processed by the system of the preferred embodiment of the invention.

An example of how predicates are represented by rectangles is shown in the graph of FIG. 2 which depicts the "Underpaid" and "Overpaid" predicates:

Underpaid: Salary<30000 OR (Number_of_patents>60 AND Salary<80000)

Overpaid: (Number_of_patents<20 AND Salary>50000)

The vertical axis represents salary, and the horizontal axis represents number of patents. The predicates relate to work place statistics for employees. Each employee can be placed at a particular point in this graph in accordance with his or her salary and number of patents. An employee with a high salary but a small number of patents will fall in the upper-left portion of the graph, while an employee with a low salary but a large number of patents will fall in the lower-right portion of the graph. The hatched regions of the graph 30 corresponds to the predicate "Overpaid" and the hatched region 32 to the predicate "Underpaid". Since hatched regions 30 and 32 do not intersect, it can be seen that a given point in the graph cannot belong to both of these regions—and hence that a given employee cannot simultaneously be classified as "Overpaid" and "Underpaid".

Figure 3A:
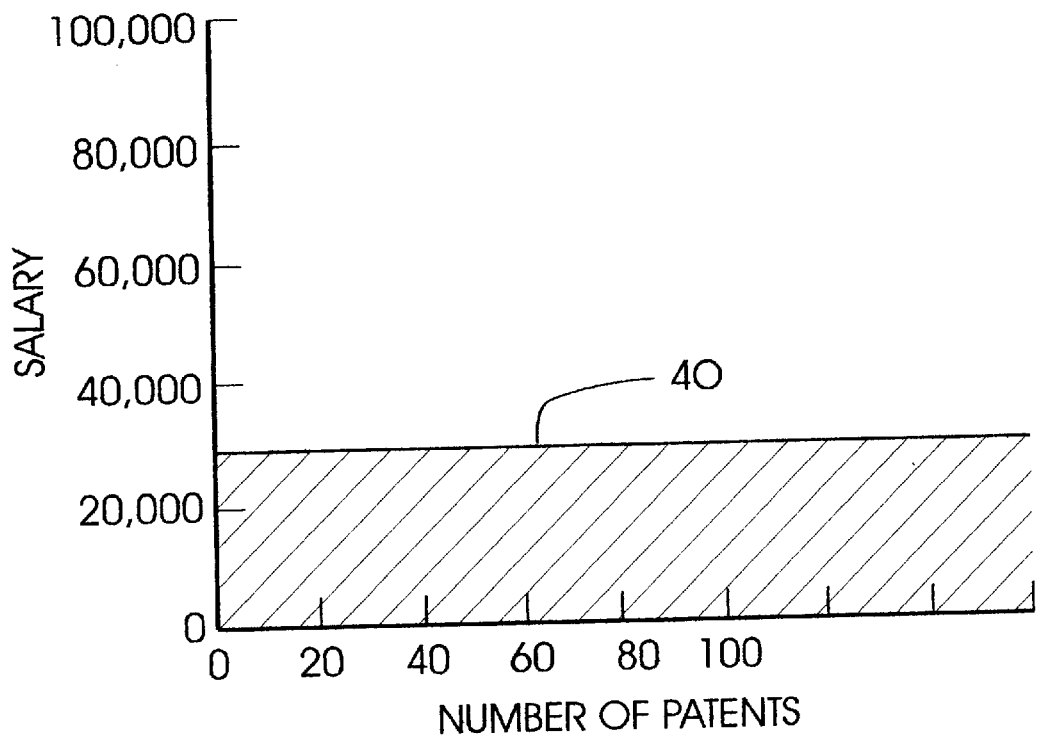
FIGS. 3a and 3b are graphical representations of elements of one of the predicate shown in FIG. 2.
Figure 3B:
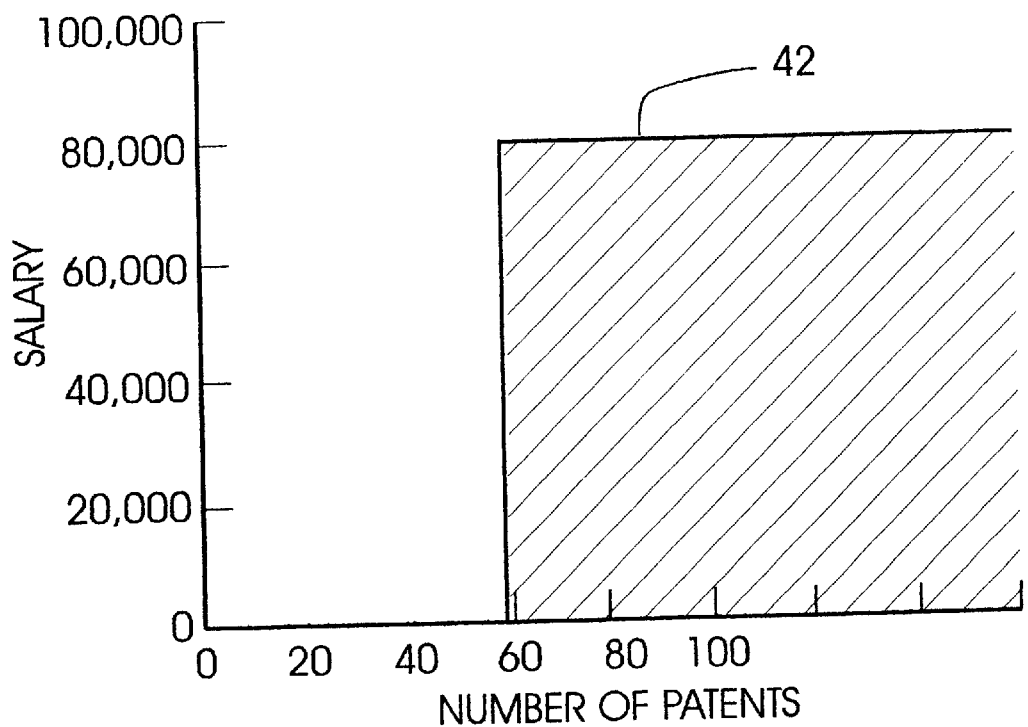

According to the preferred embodiment, each predicate is represented by a collection of rectangles. In the example of FIG. 2, predicate for "Overpaid" is represented by the single rectangle 32 (in this simple example, the predicate is a collection of rectangles that happens to contain just one rectangle). By contrast, the predicate "Underpaid" is represented by the two rectangles shown as shaded regions 40 and 42 in the graphs of FIGS. 3a and 3b. The rectangle of shaded region 40 reflects the first half of the predicate, namely "Salary<30000". The rectangle of shaded region 42 represents the second half of the predicate.

If a given employee's salary and number of patents lie inside either of these two rectangles of shaded regions 40 and 42, then the employee is be classified as "Underpaid". Conversely, if an employee should be classified as "Underpaid," then that employee's salary and number of patents will lie inside one or the other of the two rectangles of shaded regions 40 and 42 (or possibly inside both). Neither rectangle by itself suffices to characterize the predicate for "Underpaid"; instead these two rectangles are combined in a collection of rectangles, as the representation for the predicate for "Underpaid".

The intersection of the two rectangles of shaded regions 40 and 42 is of no particular consequence to the preferred embodiment, since both of these rectangles pertain to the same predicate. Intersection of rectangles is, however, significant to the issue of mutual exclusion of predicates when the rectangles in question pertain to two (or more) different predicates; in that case, a non-empty intersection is treated by the preferred embodiment, as described below, as an indication that the predicates in question are not mutually exclusive.

The predicate shown graphically in FIG. 2 involves a 2-dimensional figure. Two dimensions suffice because the predicate shown has precisely two variables, namely Salary and Number_of_patents. In general, the preferred embodiment of the invention will relate to predicates containing N variables, and consequently the geometric representations of the preferred embodiment are N-dimensional "rectangles."

As will be apparent, the shaded regions 30 and 32 are necessarily limited graphical representations of regions with infinite extent. For example, the depiction of "Salary<30000", tacitly assumes that "Salary" cannot be negative—but in general one cannot make any such assumption. The "rectangle" for "Salary<30000", extends to negative infinity on the Salary dimension. Similarly, the same "rectangle", in the Number_of_patents dimension, extends from negative infinity to positive infinity.

Any given N-dimensional rectangle may be characterized by its lower and upper bounds on each dimension. For example, a 9-dimensional rectangle is characterized by a lower bound and an upper bound for each of its nine dimensions. On any given dimension, a rectangle's lower bound may be negative infinity, and its upper bound may be positive infinity.

The representation of a rectangle in the preferred embodiment must also include an indication of whether the ranges which define the rectangles include end points (for example, "<=") or do not include end points (for example, "<").

According to the preferred embodiment of the invention, all the variables that occur in the predicates under consideration must be identified. As a side effect of identifying these variables, the dimensionality of the rectangles to be manipulated is determined.

In the predicates used in the illustration of FIG. 2, there are exactly two variables, namely Salary and Number_of_patents. On identifying these two variables, the preferred embodiment of the invention will manipulate collections of 2-dimensional rectangles. That is, the number of dimensions always equals the number of variables.

The approach of the invention permits some latitude in what the system considers to be a "variable". Different notions of "variable" are capable of being accommodated equally well by the technique of the preferred embodiment, however, the description of the preferred embodiment set out below describes the preferred embodiment with respect to a particular definition of "variable", as described below.

A "variable" may be a simple variable, such as Salary or Number_of_patents; alternatively, it may be an arithmetic expression such as "Salary+Bonus" or "Hours*Wage." More complex expressions, including expressions that may involve the use of functions (for example, sin, cos, log, exp, substr, concat) are also considered to be "variables".

Two occurrences of the same expression are considered to be instances of the same "variable." For example, if "Salary+Bonus>100000" appears in one predicate, and "Salary+Bonus<40000" appears in another predicate, then both these predicates are referring to a single variable "Salary+Bonus," and the two occurrences together contribute only one dimension to the dimensionality of the rectangles.

If a quantity such as "Salary" appears only as part of a larger expression such as "Salary+Bonus," then "Salary" by itself will not be considered a variable in its own right, and will not contribute to the dimensionality of the rectangles. However, if "Salary" appears by itself in an inequality such as "Salary<30000" and also appears in an inequality of the form "Salary+Bonus<40000", then "Salary" and "Salary+Bonus" will be considered separate variables.

The simplest predicates for the preferred embodiment to represent as rectangles are those that compare a variable to a constant using an equality or inequality operator, such as ">", "<", "<=", ">=", "=", or "<>". As a rule, each such predicate is converted into a single rectangle (the collection in these instances happens to consist of a single rectangle). The "rectangles" obtained from these simple predicates are degenerate: All their bounds are infinite, except for one bound that is obtained from the constant in the predicate.

For example, in the 2-dimensional setting of the illustrations, the predicate "Salary>=40000", would yield the rectangle characterized as follows:

| Lower Bound | | Variable | | Upper Bound |
| --- | --- | --- | --- | --- |
| 40,000 | <= | Salary | < | +infinity |
| −infinity | < | Number_of_patents | < | +infinity |

In other words, any variable not mentioned in the predicate is unconstrained, and may freely range from negative infinity to positive infinity. In a 9-dimensional setting, the lower and upper bounds would both be infinite in eight of the dimensions, while a concrete lower or upper bound would be imposed in the ninth dimension.

The operators "=" and "<>" deserve special note. The "=" operator simultaneously imposes both a lower and an upper bound. Thus, the predicate "Salary=40000", would yield:

| Lower Bound | | Variable | | Upper Bound |
| --- | --- | --- | --- | --- |
| 40,000 | <= | Salary | < | +infinity |
| −infinity | < | Number_of_patents | < | +infinity |

Predicates involving "<>" are converted to slightly more complex predicates that avoid the use of "<>". For example, "Salary<>10000" is reinterpreted as "Salary<10000 OR Salary>10000" and is then handled according to the policies for OR-predicates described below.

For a predicate such as "Salary>Bonus", which does not have a constant on either side of the comparison operator, the preferred embodiment cannot give the predicate an exact characterization as a collection of rectangles. Instead the preferred embodiment designates the meaning of such predicates as UNKNOWN. The preferred embodiment cannot make strong inferences about UNKNOWN predicates, but in some cases mutual exclusivity of complex predicates can be established even if portions of these predicates are designated as UNKNOWN.

The preferred embodiment represents UNKNOWN predicates as rectangles whose lower and upper bounds are infinite in all dimensions. This representation simplifies the processing of UNKNOWN predicates, but the same effect can also be achieved with other representations.

To deal with complex predicates the preferred embodiment performs two kinds of manipulations on rectangles—intersection and coalescing.

The intersection of two rectangles is always another rectangle, and is computed as follows: on each dimension, the lower bound of the intersection is taken to be the maximum of the lower bounds for the two given rectangles, while the upper bound is taken to be the minimum of the upper bounds. Endpoints are included if they fall within the ranges specified for both the given rectangles.

Figure 4:
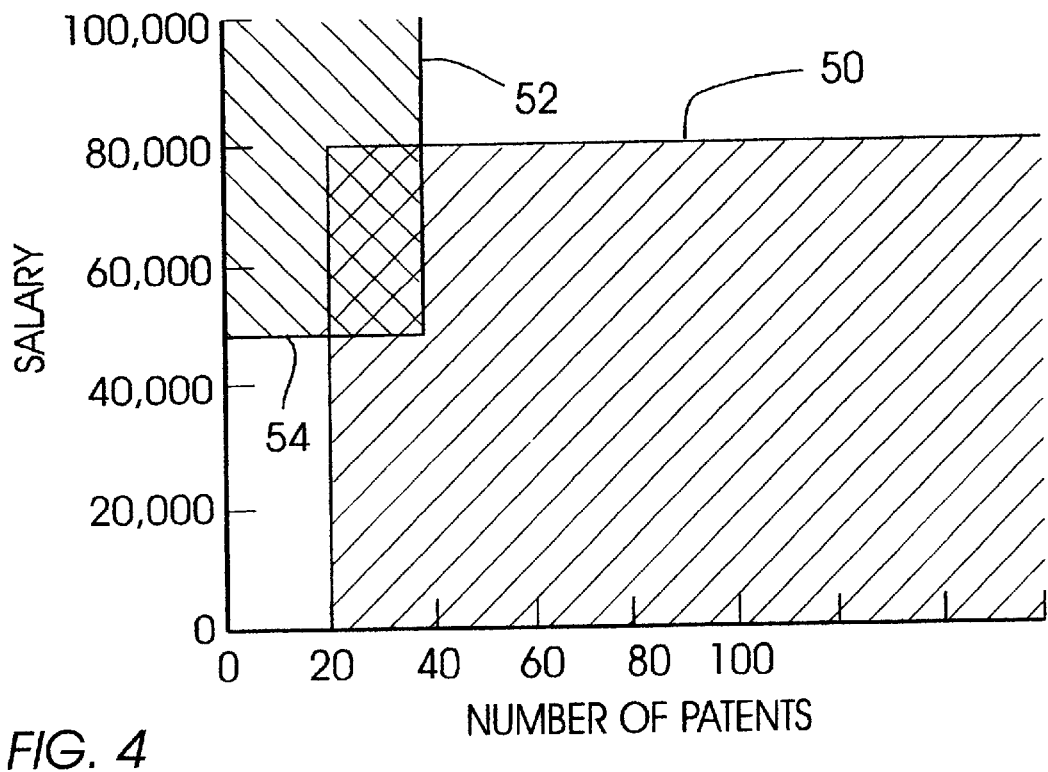
FIG. 4 is a graphical representation of a the intersection of two rectangles representing predicates of the type processed by the system of the preferred embodiment of the invention.

An example of the intersection of two rectangles is shown in FIG. 4. FIG. 4 represents the following two predicates:

| Lower Bound | | Variable | | Upper Bound |
| --- | --- | --- | --- | --- |
| 0 | < | Salary | < | 80,000 |
| 20 | < | Number_of_patents | < | +infinity |
| 40,000 | < | Salary | < | +infinity |
| −infinity | < | Number_of_Patents | < | 40 |

The shaded region 50 represents the first predicate, and the shaded region 52 the second. The intersection of the two predicates is shown as the cross-hatched region 54. The rectangle of the intersection region 54 is defined:

| Lower Bound | | Variable | | Upper Bound |
| --- | --- | --- | --- | --- |
| 40,000 | < | Salary | < | 80,000 |
| 20 | < | Number_of_Patents | < | 40 |

It can happen that in the result of an intersection, the upper bound on some dimension is actually lower than the corresponding lower bound. In such cases (and also when the upper and lower bounds are equal, but are excluded from the range), the intersection is EMPTY. An empty intersection on any single dimension renders the intersection as a whole EMPTY, regardless of the bounds on the other dimensions. As a rule, EMPTY rectangles are simply discarded by the preferred embodiment. (Thus, a collection of eight rectangles, of which five turn out to be empty, simply reduces to a collection of three rectangles.)

Whereas intersecting two rectangles entails finding a rectangle that contains all the points common to both the given rectangles, coalescing two rectangles entails finding a rectangle that contains all the points of either of the given rectangles. It is not always possible to coalesce two rectangles into a single rectangle—nor is it necessary. Since the preferred embodiment represents predicates by collections of rectangles, the preferred embodiment may always retain as many rectangles as are necessary to cover a region. The preferred embodiment coalesces rectangles within a collection, when practicable, merely to reduce the number of rectangles the preferred embodiment must deal with.

By reducing the number of rectangles represented and manipulated at any one time the speed of the implementation of the preferred embodiment and the memory consumption of the implementation are both reduced.

Figure 5:
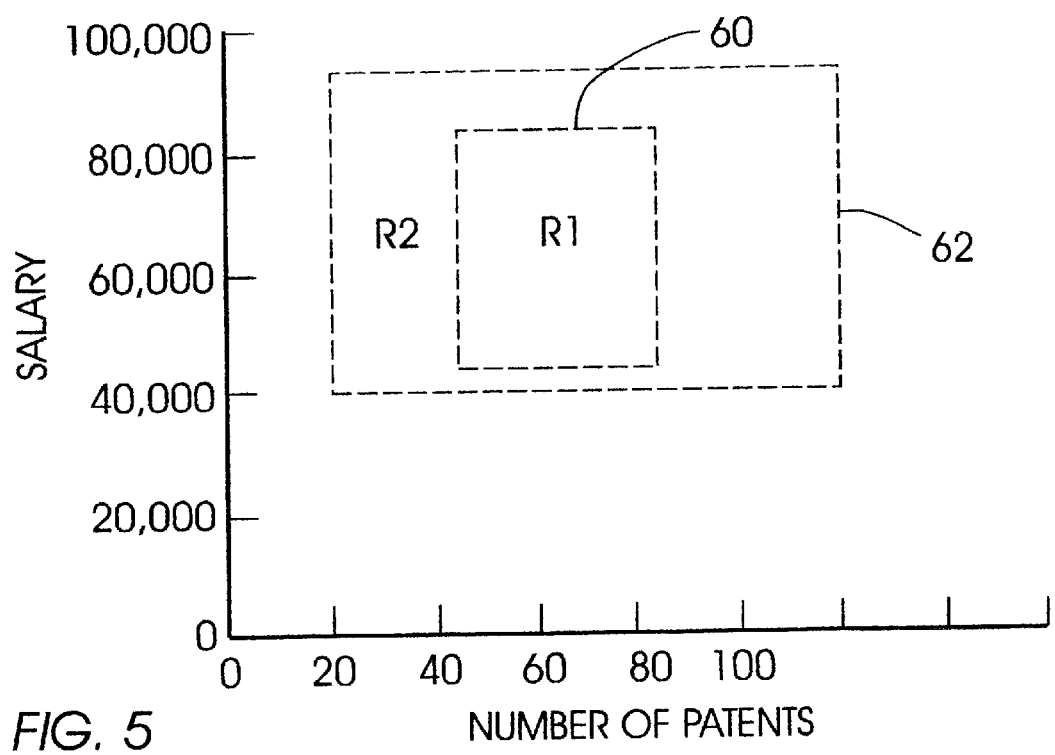
FIG. 5 is a graphical representation of a two predicates of the type represented by rectangles which can be coalesced by the system of the preferred embodiment of the invention.

A pair of rectangles can easily be coalesced under two circumstances:

(1) One of the rectangles is entirely contained within the other. This is illustrated in FIG. 5. In this case, the intersection of the two rectangles, R1 (region 60) and R2 (region 62), is precisely the same as one of these rectangles, in this case R1 (the "contained" rectangle shown as region 60). Then R1 and R2 may be coalesced into R2 (the "containing" rectangle, region 62), and R1 may be discarded.

Figure 6:
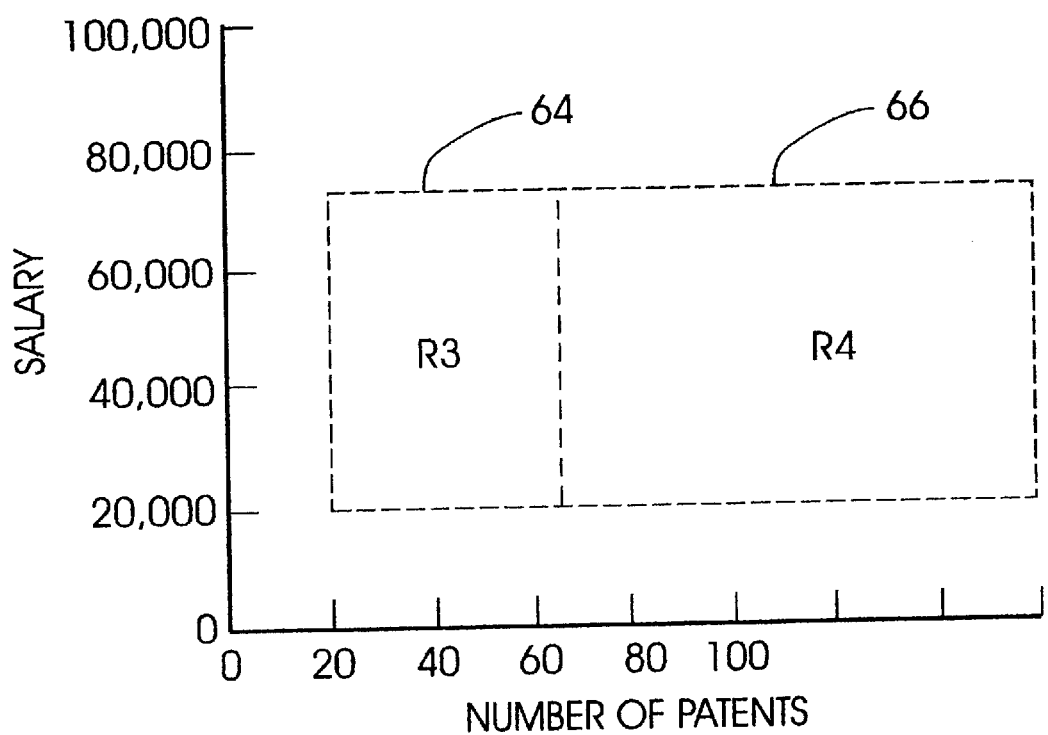
FIG. 6 is a graphical representation of a two further predicates of the type represented by rectangles which can be coalesced by the system of the preferred embodiment of the invention.

(2) The two rectangles, shown for example in FIG. 6, as R3 (region 64) and R4 (region 66), exactly agree in all dimensions but one, and additionally have a nonempty intersection (or "touch" one another). In this case, the preferred embodiment may construct a new rectangle, that is identical to R3 and R4 in their dimensions of agreement; in the remaining dimension, the new rectangle takes its lower bound from the lower of the corresponding bounds in R3 or R4, and its upper bound from the higher of the corresponding bounds in R3 or R4.

The preferred embodiment of the invention also represents and manipulates complex or composite predicates that are built up from simple predicates using the Boolean operators AND, OR, and NOT.

For a predicate of the form "p AND q", the preferred embodiment may convert each of p and q into a collection of N-dimensional rectangles. Using intersection, the preferred embodiment will then combine these two collections of N-dimensional rectangles into a single, new collection of N-dimensional rectangles. If the conversion of p yields a collection {R1, R2} containing two rectangles, and the conversion of q yields a collection {R3, R4, R5} containing three rectangles, a point that is contained within both these collections necessarily lies inside one or more of the following intersections:

{R1 intersect R3, R1 intersect R4, R1 intersect R5, R2 intersect R3, R2 intersect R4, R2 intersect R5}

More generally, the preferred embodiment manipulates the predicate as follows: let p be converted into a collection C1 of N-dimensional rectangles, and let q be converted into another collection C2. Then the preferred embodiment takes the cross product of C1 and C2, and combines the resultant pairs of rectangles by taking their intersections. The collection consisting of these intersections becomes the representation for "p AND q."

Although it is possible that if C1 contains J rectangles, and C2 contains K rectangles, then the representation of "p AND q" could contain (J times K) rectangles, in practical systems, many of the intersections in such a collection are likely to be EMPTY rectangles, and these EMPTY rectangles will be discarded.

If the representation of p turns out to be UNKNOWN, then the preferred embodiment will conservatively take the representation of "p AND q" to be just C2—that is, the preferred embodiment ignores p; whereas if the representation of q turns out to be UNKNOWN, then the preferred embodiment conservatively takes the representation of "p AND q" to be C1—i.e., in this case the preferred embodiment ignores q. (If both p and q have UNKNOWN representations, then the representation of "p AND q" is also UNKNOWN). These policies regarding UNKNOWN predicates result automatically from the representation of UNKNOWN predicates as described above. Because of these policies, it is sometimes possible for the preferred embodiment to demonstrate mutual exclusivity of predicates that include fragments the preferred embodiment cannot translate into collections of rectangles.

For a predicate of the form "p OR q," where p and q may be simple predicates, or may themselves be composite predicates, the preferred embodiment converts each of p and q into a collection of N-dimensional rectangles, for example C1 for p and C2 for q. To obtain a collection of N-dimensional rectangles that represents the predicate "p OR q," the preferred embodiment simply combine the collections C1 and C2. If C1 contained three rectangles, and C2 contained five rectangles, the preferred embodiment would obtain a collection of eight rectangles that represents "p OR q." However, the preferred embodiment attempts to coalesce any rectangles that originally came from C1 with rectangles that originally came from C2; and for this reason, the number of rectangles in the resultant collection may actually be less than the sum of the numbers of rectangles in C1 and C2.

If the representation of either p or q is UNKNOWN, then the representation of "p OR q" is also UNKNOWN.

A third Boolean operator "NOT" gives rise to predicates of the form "NOT p." There are three subcases to consider:

(1) p has the form "q AND r". Then the given predicate "NOT p" has the form "NOT (q AND r)", which by one of the de Morgan laws is equivalent to "(NOT q) OR (NOT r)." So the preferred embodiment then represents and manipulates this predicate instead, and thus avoids dealing with NOT at the top level of the predicate.

(2) p has the form "q OR r". Then the given predicate "NOT p" has the form "NOT (q OR r)", which by the other de Morgan law is equivalent to "(NOT q) AND (NOT r)." Again the preferred embodiment represents and manipulates this predicate instead.

(3) p is a simple comparison predicate such as "Salary<80000." The negation of every such simple comparison predicate is just another simple comparison predicate. In this instance, the negation is "Salary>=80000". The preferred embodiment can therefore represent this negated predicate in place of "NOT p".

Iterative application of these subcases causes the NOT operator to be "pushed down" to the simple comparison predicates, so the preferred embodiment never has to apply a NOT operator explicitly to a collection of rectangles. Aside from inducing the de Morgan transformations noted above, the only role of the NOT operator is to invert primitive comparison operators.

The fact that the preferred embodiment never applies a NOT operator explicitly to a collection of rectangles is necessary for the correctness of the predicate representations in the preferred embodiment. Specifically, the correctness of the handling of UNKNOWN subpredicates in AND predicates hinges on the fact that no NOT operators will be applied to the result of the AND operator—nor to any subsequent results built on top of such a result. If NOT operators could be applied to the result of an AND operator, then the policy of discarding the UNKNOWN portion of an AND predicate would no longer be conservative. As it is, the policy assures that the geometric representation of a predicate will, if anything, be too large, but never too small. The preferred embodiment may therefore sometimes fail to recognize a vacuously FALSE predicate as being vacuously FALSE; but any predicate that it recognizes as being vacuously FALSE will in fact be so. Accordingly, the preferred embodiment may sometimes fail to establish mutual exclusivity of to predicates that are in fact mutually exclusive; but the preferred embodiment will never falsely conclude that two predicates are mutually exclusive when in fact they are not.

In operation, the system of the preferred embodiment is used to verify mutual exclusivity of two predicates. Given predicate p and predicate q, the system applies the rectangle representation and manipulation steps set out above to create the representation of "p AND q", as a collection of N-dimensional rectangles. If this collection is empty, then p AND q is vacuously FALSE, and hence the predicates p and q are mutually exclusive.

An example of where the preferred embodiment has application is in a computer program in the relational database product from IBM named DB2 UDB for Common Servers, Version 5.2. In particular, this product supports "object views", a feature to be included in the SQL3 ANSI standard. Object views may be grouped in hierarchies. It is a requirement of object views that the rows in each view in the hierarchy must be distinct from the rows in the other views. View definitions therefore involve predicates which must be mutually exclusive from one another. The mutual exclusivity of the views must be verified at the time that the view is created. The preferred embodiment is applicable to this problem as it is advantageous to have a system or method which can be invoked to ensure that a defined view is mutually exclusive in comparison with the other defined views in a hierarchy of object views. The preferred embodiment is able to verify the mutual exclusivity of the defined object views, although, due to the conservative approach of the preferred embodiment, it is possible that a set of object views will not be identified as mutually exclusive when, in fact, it is.

The preferred embodiment, by assessing quickly and with limited memory requirements, the mutual exclusivity of defined object views, provides advantages over more cumbersome theorem proving approaches which may be adopted to solve the same problem. Using the preferred embodiment system of verifying that the predicate "p AND q" is vacuously FALSE, where both p and q are predicates relating to the object views in the hierarchy, prevents long delays in object view creation when programming in DB2 UDB.

The method and system of the preferred embodiment may be seen by reference to FIGS. 7 through 16 which represent a high level flow chart of the operation of the preferred embodiment with respect to SQL predicates.

Figure 7:
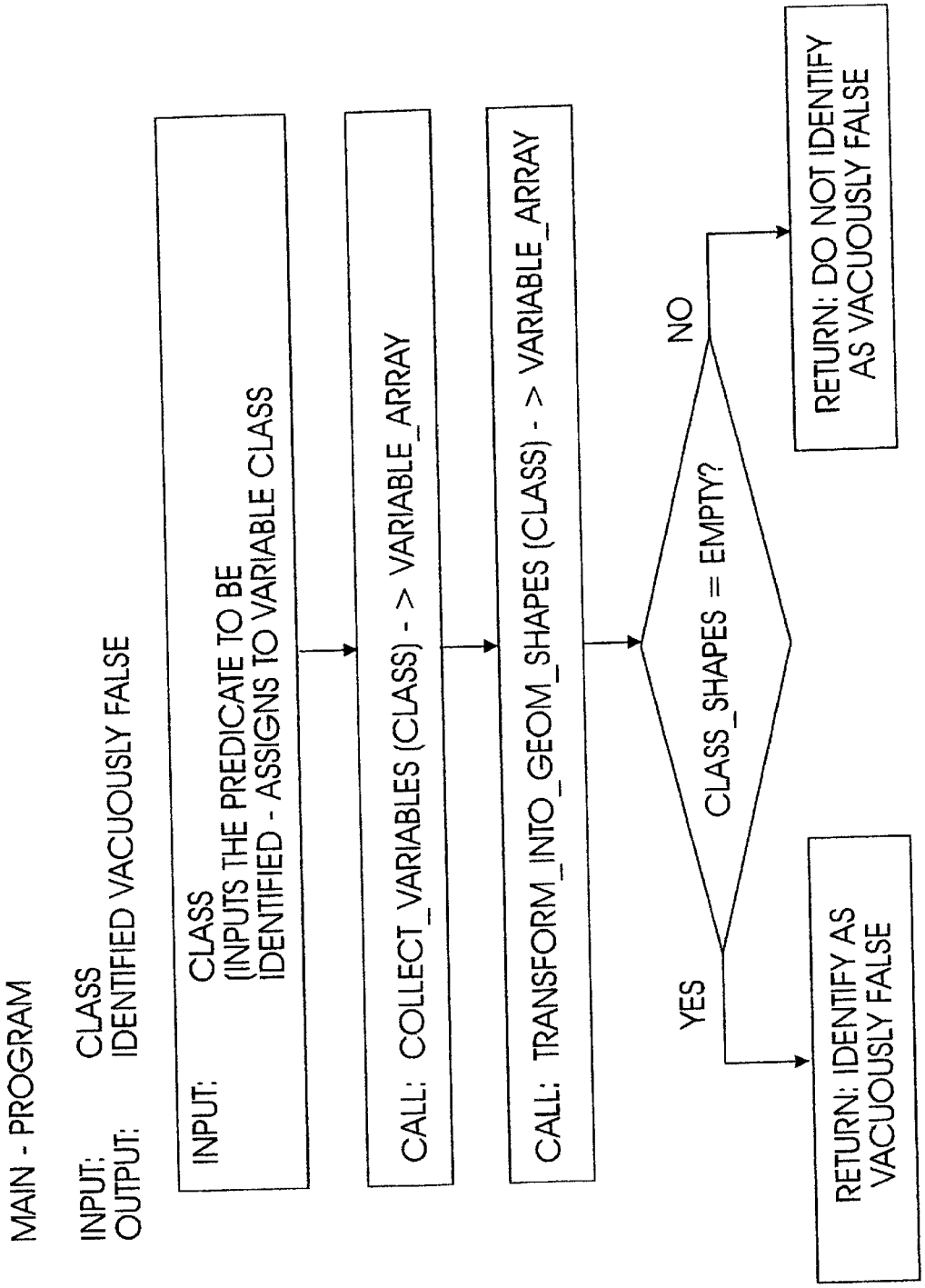

FIG. 7 shows the main program flow chart. The program takes as its input a predicate and its output is an identification of whether the input predicate is vacuously FALSE. In the example shown in the flowcharts, the predicate is referred to as "class", as in the SQL example of the flowcharts the predicate can be thought of as being related to a classification which is characterized by the predicate.

As is apparent, the flow chart in FIG. 7 may simply be input a predicate which corresponds to predicates to be identified as being mutually exclusive (for example p AND q). The main program calls the collect_variables subroutine referred to in FIG. 8 and described below. The main program then calls the transform_into_geom_shapes subroutine, shown in FIG. 9 and described below, which returns a shape (class_shape). The returned shape is then compared against empty to determine whether the input predicate is vacuously FALSE or not.

Figure 8:
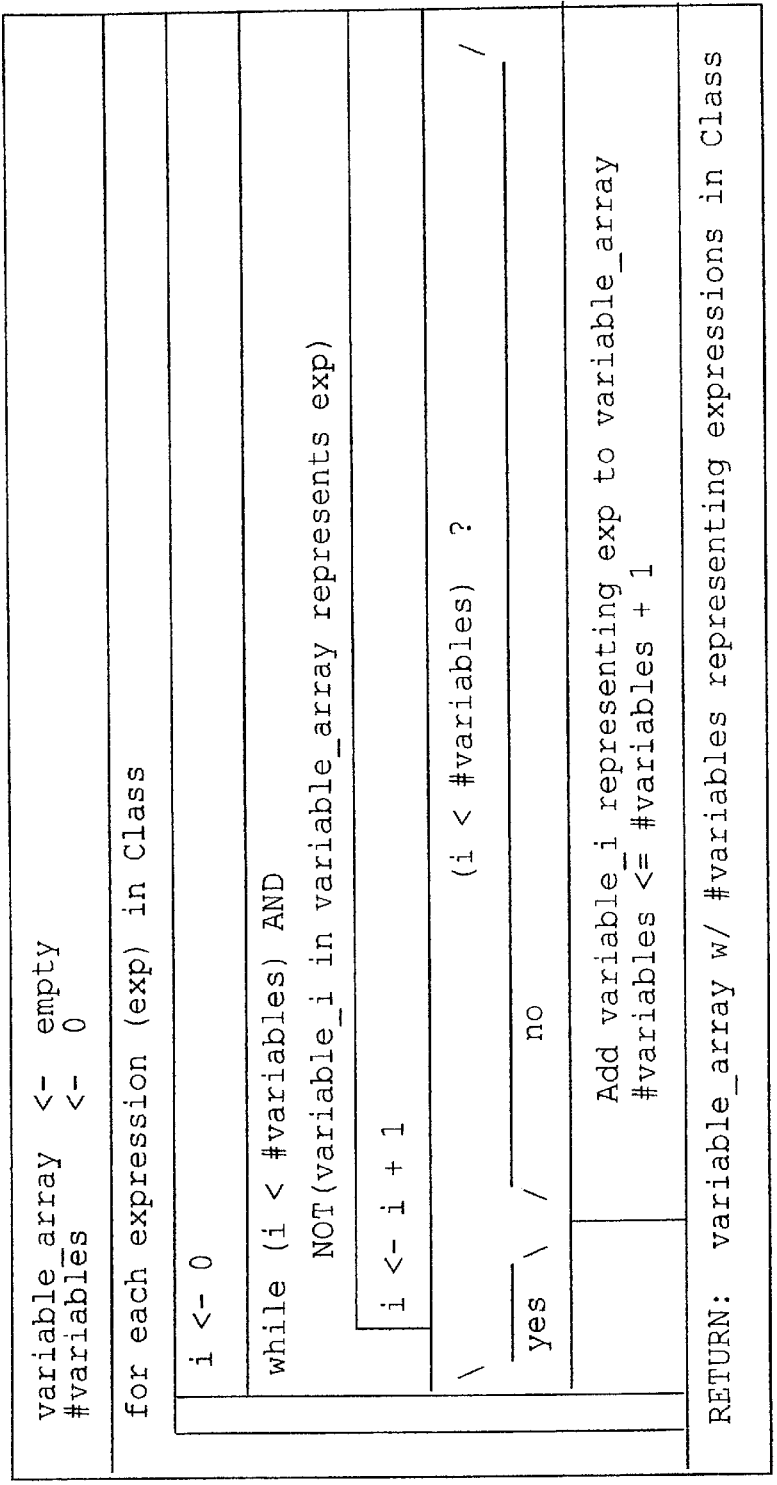

The collect_variable subroutine is described in the flow chart of FIG. 8. The input is a predicate definition and the output is a variable_array representing the expression used in the input class. As referred to above, the way in which the preferred embodiment deals with variables is subject to different approaches. In FIG. 8, the expression "variable_i in variable_array represents exp" may be subject to different implementations. In one simple approach, which is in accordance with the preferred embodiment of the invention, the identification of equivalent expressions can be carried out with syntactic analysis, only. In other cases, semantic knowledge may be used in the determination of equivalence of expressions (for example, recognizing that a+b is equivalent to b+a).

As may be seen from the flow chart in FIG. 8, each expression in the input class is compared with the variable_array as it is constructed by the subroutine. If the expression being compared to the variable_array is not found in the variable_array it is added to the variable_array.

FIG. 9 shows the flow chart for the subroutine transform_into_geom_shapes. This flow chart represents a subroutine which takes as its input a predicate definition and a variable_array and outputs a list of rectangles which represent the input predicate. The flow chart calls the subroutine replace_expressions_w_variables. This subroutine replaces complex expressions by variables in an array. A further call to the subroutine Solve_IN_etc replaces special SQL constructs such as IN and BETWEEN with predicates that use simple relational operators such as "=" and "<=". A further call to the subroutine pushdown_NOTs eliminates the NOT predicates by pushing them down in accordance with the de Morgan laws, as described above. A final call is to the recursive subroutine build_geom shapes_recursive which returns class shapes which are the geometric shapes representing the transformed class.

FIG. 10 is the flow chart representing the subroutine replace_expressions_w_variables. In this flow chart, all occurrences of an expression that is represented in the variable_array is replaced by a variable. Expressions not represented by any variable are set to the value UNKNOWN.

FIG. 11 shows a flowchart which takes as input a predicate definition using SQL predicates. The method of the flowchart of FIG. 11 replaces all occurances of IN and BETWEEN by semantically equivalent predicates.

FIG. 12 shows the flow chart for the subroutine pushdown_NOTs. This subroutine takes as its input a predicate definition and outputs a predicate definition which replaces all occurences of NOT or not equal by semantically equivalent predicates. The approach implemented by the subroutine is described above.

Figure 13:
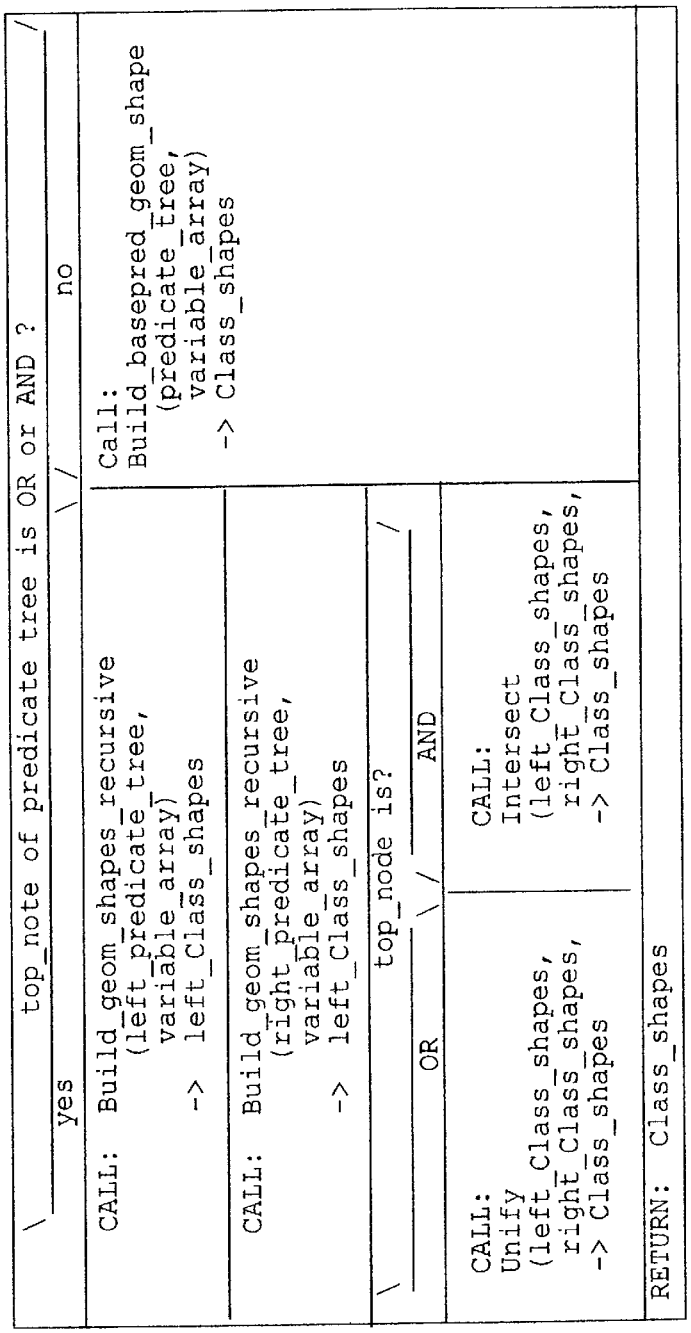

FIG. 13 is a flow chart representing the subroutine build_geom_shapes_recursive and takes as its input a predicate tree and a variable_array and outputs the class shapes which is a list of rectangles representing the predicate. In the implementation set out in the flow chart of FIG. 13, if the predicate tree is an unknown predicate the class shapes will be a single rectangle embodying the whole variable space. If the predicate tree is a base predicate, class shapes will be a single rectangle embodying the whole variable space except for the variable the base predicate operates on. This is a recursive subroutine. Rectangles are computed by first evaluating those rectangles of the parameters of a given predicate. When this is done it interprets an OR predicate as the unification of the two lists of rectangles and an AND as its geometric intersection. For the first call of this routine the predicate tree is the whole predicate. For each subsequent call and the original predicate will be a sub-tree of the predicate tree. When the build_geom_shapes_recursive subroutine handles the top node of a predicate tree which is not an OR or an AND it calls the build_basepred_geom_shape subroutine as shown in FIG. 14.

The FIG. 14 flow chart shows a subroutine having an input of a base predicate tree and variable_array and an output of shapes. The output is either a list of one rectangle describing the base predicate in the variable space or a rectangle describing the variable space as a whole if the predicate, expressions or constant is unknown. The subroutine narrow_shapes is called by the subroutine of FIG. 14. Narrow_shapes returns a shape which is restricted, in the manner set out in the base predicate (i.e. <, <=, >, >=) in the dimension i, with respect to the value of the constant passed to the routine.

Since the preferred embodiment deals with SQL predicates, the flowchart of FIG. 14 handles the IS NULL and IS NOT NULL operators as well as the relational operators. The preferred embodiment uses, for each dimension, a flag to record whether a NULL value is forbidden on that dimension, and a separate flag to record whether a NULL value is required. In effect, the NULL value may be thought of as a special value that lies outside the range from negative infinity to positive infinity. Predicates such as "Salary>=40000", "Salary=40000", and "Salary IS NOT NULL" exclude (i.e. forbid) the NULL value on the Salary dimension, while the predicate "Salary IS NULL" requires the NULL value on the Salary dimension (and hence excludes all values in the range from negative infinity to positive infinity). On dimensions not referenced by the predicates (in the foregoing examples, dimensions other than the Salary dimension), NULL values are neither forbidden nor required.

FIG. 15 is the flow chart for the subroutine unify. This subroutine eliminates rectangles that are contained in other rectangles. Rectangles are merged to bigger ones if they overlap in one dimension and are equal otherwise. It will be understood by those skilled in the art that the flow chart represented in FIG. 15 is not optimized for run time and enhancements are possible.

Figure 16:
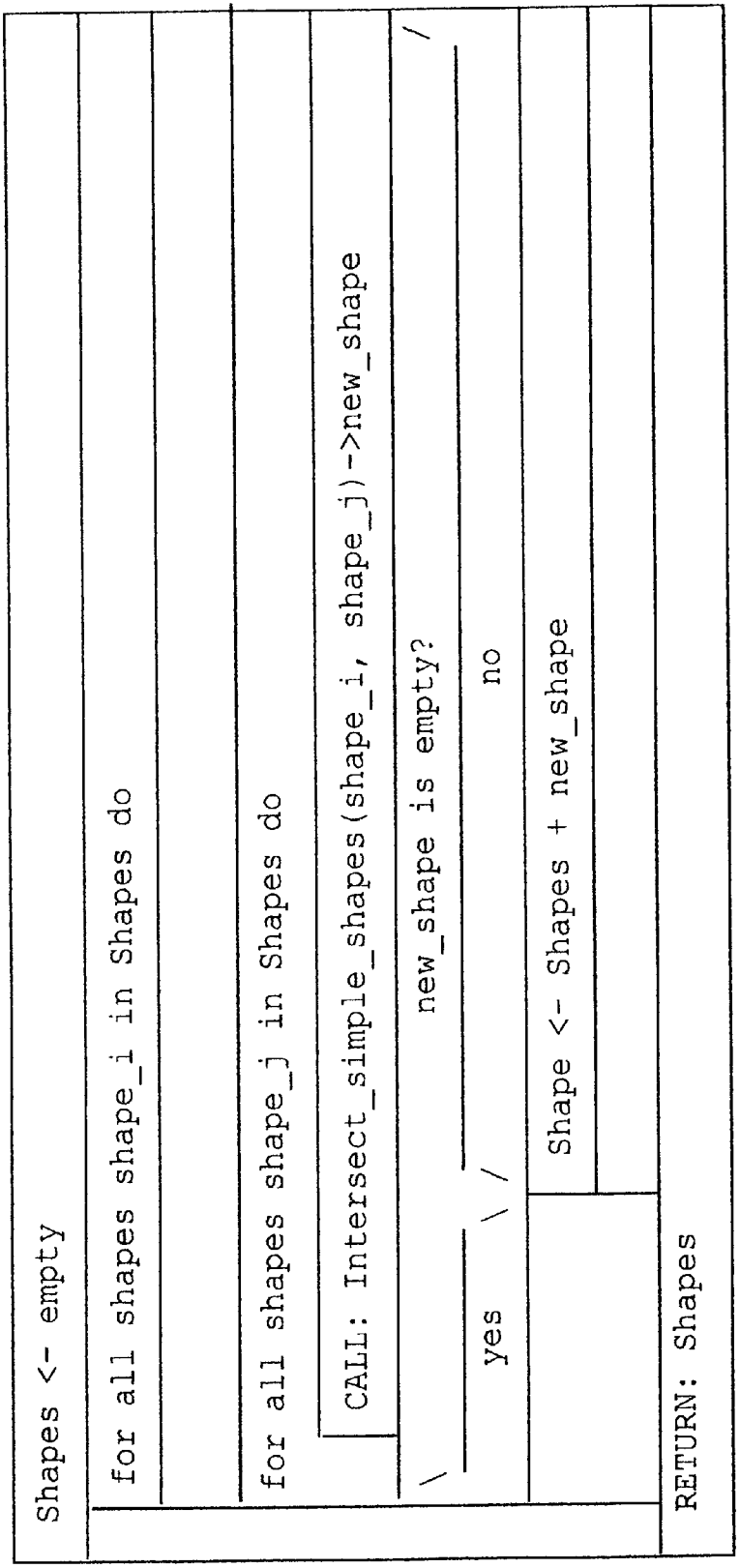

FIG. 16 shows the flow chart for the subroutine intersect. The subroutine takes as input two sets of shapes to be intersected and outputs the intersection of the two sets of input shapes.

It will be appreciated by those skilled in the art that the flowcharts of FIGS. 7 to 16 provide a high-level description of how the preferred embodiment of the invention operates in practice. The flowcharts are expressed in pseudo-code and in English and require further coding to permit a computer system to carry out the operations referred to in the flowcharts. The implementation of the subroutines set out in the flowcharts is a step which may be carried out by those skilled in the art.

Although a preferred embodiment of the present invention has been described here in detail, it will be appreciated by those skilled in the art, that variations may be made thereto, without departing from the spirit of the invention or the scope of the appended claims.

What is claimed is:

1. A computer system for identifying a predicate in a computer program as vacuous, the predicate containing one or more constant expressions, comprising:

means for identifying distinct variables contained in the predicate and for defining a predicate dimension number equal to the number of variables identified in the predicate;

means for representing the predicate by a set of bounding rectangles, wherein a bounding rectangle is represented in a space having a number of dimensions equal to the predicate dimension number;

wherein a finite limit on a dimension of a bounding rectangle represents the relationship between a one of the identified variables contained in the predicate and a one of the constant expressions in the predicate; and means for signalling that the predicate is vacuously FALSE where the set of bounding rectangles is empty.

2. The computer system of claim 1 in which the means for representing the predicate by a set of bounding rectangles comprises:

means for deriving the set of bounding rectangles whereby a first selected one of the bounding rectangles is discarded from the set of bounding rectangles when the first selected one of the input rectangles is empty, discarded from the set of bounding rectangles when the selected one of the bounding rectangles is contained within any other rectangle in the set of bounding rectangles, merged with a second selected one of the bounding rectangles when the two rectangles exactly agree in all dimensions but one.

3. The computer system of claim 1 in which means for representing the predicate by a set of bounding rectangles comprises a means for deriving the set of bounding rectangles by replacing a selected pair of rectangle sets in the set of bounding rectangles with a replacement rectangle set where the selected pair of rectangle sets correspond to expressions in the predicate subject to the operator AND, and where the replacement rectangle sets represent the intersection of the selected pair of rectangle sets.

4. The computer system of claim 2 in which the means for representing the predicate by a set of bounding rectangles comprises:

transforming means for transforming the predicate into an intermediate expression logically equivalent to the predicate, the intermediate expression containing only subexpressions which may be directly represented as rectangles;

and means for representing the intermediate expression as a set of bounding rectangles.

5. The computer system of claim 4 in which the intermediate expression consists of expressions containing at least one of AND, OR and base predicates.

6. The computer system of claim 5 in which base predicates consist of expressions containing at least one of =, <, >, <=, >=, IS NULL and IS NOT NULL, and in which each base predicate is represented by a bounding rectangle.

7. The computer system of claim 4 in which the intermediate expression consists of SQL expressions containing at least one of AND, OR, =, <, >, <=, >=, IS_NULL and IS_NOT_NULL.

8. The computer system of claim 4 in which the transforming means comprises means for replacing expressions containing NOT and expressions containing <> with logically equivalent expressions containing only one or more of AND, OR, =, <, >, <=, and >=.

9. The computer system of claim 8 in which the means for replacing expressions containing NOT and expressions containing <> implements the de Morgan laws.

10. The computer system of claim 1 in which the means for identifying variables uses syntactic matching to recognize distinct variables.

11. The computer system of claim 1 in which the means for identifying variables uses semantic rules to recognize distinct variables.

12. A method for identifying a predicate in a computer program as vacuous, the predicate containing one or more constant expressions, comprising the steps of:
   identifying distinct variables contained in the predicate;
   defining a predicate dimension number equal to the number of variables identified in the predicate;
   representing the predicate by a set of bounding rectangles, wherein a bounding rectangle is represented in a space having a number of dimensions equal to the predicate dimension number;
   wherein a finite limit on a dimension of a bounding rectangle represents the relationship between a one of the identified variables contained in the predicate and a one of the constant expressions in the predicate; and
   signalling that the predicate is vacuously FALSE where the set of bounding rectangles is empty.

13. The method of claim 12 in which representing the predicate by a set of bounding rectangles comprises the steps of:
   deriving the set of bounding rectangles whereby a first selected one of the bounding rectangles is discarded from the set of bounding rectangles when the first selected one of the input rectangles is empty;
   discarded from the set of bounding rectangles when the selected one of the bounding rectangles is contained within any other rectangle in the set of bounding rectangles; and
   merged with a second selected one of the bounding rectangles when the two rectangles exactly agree in all dimensions but one.

14. The method of claim 12 in which representing the predicate by a set of bounding rectangles comprises the steps of deriving the set of bounding rectangles by replacing a selected pair of rectangle sets in the set of bounding rectangles with a replacement rectangle set where the selected pair of rectangle sets correspond to expressions in the predicate subject to the operator AND, and where the replacement rectangle sets represent the intersection of the selected pair of rectangle sets.

15. The method of claim 13 in which representing the predicate by a set of bounding rectangles comprises the steps of:
   transforming the predicate into an intermediate expression logically equivalent to the predicate, the intermediate expression containing only subexpressions which may be directly represented as rectangles;
   and representing the intermediate expression as a set of bounding rectangles.

16. The method of claim 15 in which the intermediate expression consists of expressions containing at least one of AND, OR and base predicates.

17. The method of claim 16 in which base predicates consist of expressions containing at least one of =, <, >, <=, >=, IS NULL and IS NOT NULL, and in which each base predicate is represented by a bounding rectangle.

18. The method of claim 15 in which the intermediate expression consists of SQL expressions containing at least one of AND, OR, =, <, >, <=, >=, IS_NULL and IS_NOT_NULL.

19. The method of claim 15 in which transforming the predicate comprises the steps of replacing expressions containing NOT and expressions containing <> with logically equivalent expressions containing only one or more of AND, OR, =, <, >, <=, and >=.

20. The method of claim 19 in which replacing expressions containing NOT and expressions containing <> implements steps corresponding to the de Morgan laws.

21. The method of claim 12 in which identifying variables comprises the method of syntactic matching to recognize distinct variables.

22. The method of claim 12 in which identifying variables comprises the application of semantic rules to recognize distinct variables.

23. A computer system for identifying a predicate in a computer program as vacuous, the predicate containing one or more constant expressions, comprising:
   means for identifying distinct variables contained in the predicate and for defining a predicate dimension number equal to the number of variables identified in the predicate;
   means for reducing the predicate to a logically equivalent intermediate predicate which includes no operators other than those in the set of AND, OR, =, <, <=, >, >=, IS NULL and IS NOT NULL,
   means for representing the set of base predicates in the intermediate predicate by a set of rectangles wherein:
      the set of rectangles are represented in a space having a number of dimensions equal to the predicate dimension number and;
      each rectangle has limits on each of its dimensions, the limits being finite or infinite;
      a finite limit on a dimension of a rectangle representing the relationship between a one of the identified variables and a one of the constant expressions in the set of base predicates;
      an infinite limit on a dimension of a rectangle representing the absence of a relationship between a one of the identified variables and any of the constant expressions in the set of base predicates;
   means for manipulating the set of rectangles whereby;
      an AND operator in the intermediate predicate is implemented by performing an intersection on the subsets of rectangles corresponding to the portions of the intermediate predicate to which the AND operator is applied;
      the OR operator is implemented by performing a union on the subsets of rectangles corresponding to the portions of the intermediate predicate to which the OR operator is applied;
      and whereby a first selected one of the set of rectangles is;
         discarded from the set of rectangles when the first selected one of the rectangles is empty;
         discarded from the set of rectangles when the selected one of the rectangles is contained within any other rectangle in the set of rectangles;
         merged with a second selected one of the rectangles when the two rectangles exactly agree in all dimensions but one; and means for signalling that the predicate is vacuously FALSE where the set of rectangles is empty after manipulation by the means for manipulating the set of rectangles.

24. The computer system of claim 23 in which the computer language is SQL.

25. The computer system of claim 24 in which the predicate represents two or more object view definitions in SQL and the identification of the predicate as vacuously FALSE represents an error check to determine that the two or more object view definitions are mutually exclusive.

26. A method for identifying a predicate in a computer program as vacuous, the predicate containing one or more constant expressions, comprising the steps of:

identifying distinct variables contained in the predicate and defining a predicate dimension number equal to the number of variables identified in the predicate;

reducing the predicate to a logically equivalent intermediate predicate which includes no operators other than those in the set of AND, OR, =, <, <=, >, >=, IS NULL and IS NOT NULL;

representing the set of base predicates in the intermediate predicate by a set of rectangles wherein;
the set of rectangles are represented in a space having a number of dimensions equal to the predicate dimension number and;
each rectangle has limits on each of its dimensions, the limits being finite or infinite;

a finite limit on a dimension of a rectangle representing the relationship between a one of the identified variables and a one of the constant expressions in the set of base predicates;

an infinite limit on a dimension of a rectangle representing the absence of a relationship between a one of the identified variables and any of the constant expressions in the set of base predicates manipulating the set of rectangles whereby
an AND operator in the intermediate predicate is implemented by performing an intersection on the subsets of rectangles corresponding to the portions of the intermediate predicate to which the AND operator is applied;
the OR operator is implemented by performing a union on the subsets of rectangles corresponding to the portions of the intermediate predicate to which the OR operator is applied;
and whereby a first selected one of the set of rectangles is
discarded from the set of rectangles when the first selected one of the rectangles is empty;
discarded from the set of rectangles when the selected one of the rectangles is contained within any other rectangle in the set of rectangles;
merged with a second selected one of the rectangles when the two rectangles exactly agree in all dimensions but one; and
signalling that the predicate is vacuously FALSE where the set of rectangles is empty after manipulation by the means for manipulating the set of rectangles.

27. A method for error checking the mutual exclusivity of SQL object view definitions, comprising the steps of:

constructing a predicate representing two or more object view definitions in SQL;

identifying distinct variables contained in the predicate and defining a predicate dimension number equal to the number of variables identified in the predicate;

reducing the predicate to a logically equivalent intermediate predicate which includes no operators other than those in the set of AND, OR, =, <, <=, >, >=, IS NULL and IS NOT NULL;

representing the set of base predicates in the intermediate predicate by a set of rectangles wherein:
the set of rectangles are represented in a space having a number of dimensions equal to the predicate dimension number and;
each rectangle has limits on each of its dimensions, the limits being finite or infinite;

a finite limit on a dimension of a rectangle representing the relationship between a one of the identified variables and a one of the constant expressions in the set of base predicates;

an infinite limit on a dimension of a rectangle representing the absence of a relationship between a one of the identified variables and any of the constant expressions in the set of base predicates;

manipulating the set of rectangles whereby:
an AND operator in the intermediate predicate is implemented by performing an intersection on the subsets of rectangles corresponding to the portions of the intermediate predicate to which the AND operator is applied;
the OR operator is implemented by performing a union on the subsets of rectangles corresponding to the portions of the intermediate predicate to which the OR operator is applied;
and whereby a first selected one of the set of rectangles is;
discarded from the set of rectangles when the first selected one of the rectangles is empty;
discarded from the set of rectangles when the selected one of the rectangles is contained within any other rectangle in the set of rectangles;
merged with a second selected one of the rectangles when the two rectangles exactly agree in all dimensions but one; and
signalling that the object views definitions are mutually exclusive where the set of rectangles is empty after manipulation by the means for manipulating the set of rectangles.

28. A computer-readable memory for the instructions for use in the execution in a computer of the method of claim 12.

* * * * *